United States Patent
Baek

(10) Patent No.: US 12,084,016 B2
(45) Date of Patent: Sep. 10, 2024

(54) ELECTROMECHANICAL BRAKE AND OPERATION METHOD THEREOF

(71) Applicant: HL MANDO CORPORATION, Gyeonggi-do (KR)

(72) Inventor: Seungtae Baek, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 688 days.

(21) Appl. No.: 17/383,424

(22) Filed: Jul. 22, 2021

(65) Prior Publication Data

US 2022/0024434 A1    Jan. 27, 2022

(30) Foreign Application Priority Data

Jul. 24, 2020    (KR) .................. 10-2020-0092442

(51) Int. Cl.
| | |
|---|---|
| *B60T 13/74* | (2006.01) |
| *F16D 65/18* | (2006.01) |
| *F16D 121/24* | (2012.01) |
| *F16D 125/40* | (2012.01) |

(52) U.S. Cl.
CPC ............ *B60T 13/741* (2013.01); *F16D 65/18* (2013.01); *F16D 2121/24* (2013.01); *F16D 2125/40* (2013.01)

(58) Field of Classification Search
CPC .. F16D 65/183; F16D 55/226; F16D 2125/40; F16D 2121/24; B60T 13/74
See application file for complete search history.

(56) References Cited

U.S. PATENT DOCUMENTS

| | | | | |
|---|---|---|---|---|
| 2019/0316644 A1 * | 10/2019 | Demorais | ............... | F16D 65/18 |
| 2020/0256414 A1 * | 8/2020 | Gerber | .................... | F16D 65/38 |

FOREIGN PATENT DOCUMENTS

| | | | | | |
|---|---|---|---|---|---|
| DE | 102009038138 A1 | * | 12/2010 | ............ | B60T 13/741 |
| DE | 102013223962 A1 | * | 5/2015 | ............. | F16D 65/18 |
| DE | 102019205314 A1 | * | 10/2019 | ........... | F16D 55/228 |
| FR | 2470295 A1 | * | 5/1981 | | |
| KR | 101511437 B1 | * | 4/2015 | | |
| KR | 101786337 B1 | * | 10/2017 | | |
| KR | 20200108543 A | * | 9/2020 | | |

* cited by examiner

*Primary Examiner* — Vishal R Sahni

(74) *Attorney, Agent, or Firm* — Womble Bond Dickinson (US) LLP

(57) ABSTRACT

The electromechanical brake includes a piston provided to press a brake pad, a power conversion unit including a spindle, and a nut connected to the spindle to move forward or backward by rotation of the spindle in a first direction or a second direction to move the piston forward and backward, a position adjusting unit including an adjusting screw provided on the outside of the nut to rotate together with the nut, a first screw thread formed on an outer circumferential surface of the adjusting screw, a second screw thread formed on an inner circumferential surface of the piston to be engaged with the first screw thread, and an adjuster provided between the spindle and the nut to rotate the nut and the adjusting screw by rotation of the spindle to move a relative position of the piston with respect to the power conversion unit forward or backward.

15 Claims, 13 Drawing Sheets

(a)

(b)

(c)

(a)

(b)

(c)

US 12,084,016 B2

ELECTROMECHANICAL BRAKE AND OPERATION METHOD THEREOF

CROSS-REFERENCE TO RELATED APPLICATION(S)

This application is based on and claims priority under 35 U.S.C. § 119 to Korean Patent Application No. 10-2020-0092442, filed on Jul. 24, 2020, in the Korean Intellectual Property Office, the disclosure of which is incorporated by reference herein in its entirety.

BACKGROUND

1. Field

The disclosure relates to an electromechanical brake and an operation method thereof, and more particularly, to an electromechanical disc brake for performing braking of a vehicle using a rotational driving force of a motor, and an operation method thereof.

2. Description of the Related Art

A brake system for performing braking is essential to a vehicle, and various types of brake systems have been proposed for the safety of drivers and passengers.

Conventionally, a conventional brake system that supplies hydraulic pressure required for braking to wheel cylinders using a mechanically connected booster when a driver depresses a brake pedal has been mainly used. However, recently, as a next-generation brake system, an electromechanical brake system that receives a depressing force from the driver as an electric signal and operates an electric device such as a motor based on the electric signal to provide a braking force to a vehicle have been developed.

Such an electromechanical brake system converts a rotational force of a motor into a linear motion through the motor, a speed reducer, and the like to provide a clamping pressure to a brake disc, thereby performing a service brake and a parking brake of a vehicle.

A brake pad that directly contacts and presses the brake disc of a vehicle is gradually worn due to the repeated braking operation of the vehicle. In order to maintain the braking performance of a vehicle despite the wear of a brake pad, compensation for the wear of the brake pad is required, but in this case, a size or axial length of a brake system may increase, and thus applicability to the vehicle may be deteriorated.

SUMMARY

It is an aspect of the disclosure to provide an electromechanical brake and an operation method thereof capable of adjusting braking response performance and drag performance by adjusting a distance between a brake disc and a brake pad of a vehicle.

It is an aspect of the disclosure to provide an electromechanical brake and an operation method thereof capable of maintaining and improving braking performance of a vehicle despite wear of a brake pad.

It is an aspect of the disclosure to provide an electromechanical brake and an operation method thereof capable of stably braking a vehicle even in various operating situations of the vehicle.

It is an aspect of the disclosure to provide an electromechanical brake and an operation method thereof capable of improving applicability to a vehicle and space utilization of the vehicle by reducing size and weight.

It is an aspect of the disclosure to provide an electromechanical brake and an operation method thereof capable of easily compensating for wear of a brake pad with a simple structure.

It is an aspect of the disclosure to provide an electromechanical brake and an operation method thereof capable of improving braking performance and suppressing braking noise and vibration by reducing a drag phenomenon.

Additional aspects of the disclosure will be set forth in part in the description which follows and, in part, will be obvious from the description, or may be learned by practice of the disclosure.

In accordance with an aspect of the disclosure, an electromechanical brake includes a piston provided to be movable forward and backward to press a brake pad toward a brake disc rotating together with a wheel, a power conversion unit including a spindle provided to rotate by receiving a driving force from an actuator, and a nut connected to the spindle to move forward or backward by rotation of the spindle in a first direction or a second direction to move the piston forward and backward, a position adjusting unit including an adjusting screw provided on the outside of the nut to rotate together with the nut, a first screw thread formed on an outer circumferential surface of the adjusting screw, a second screw thread formed on an inner circumferential surface of the piston to be engaged with the first screw thread, and an adjuster provided between the spindle and the nut to rotate the nut and the adjusting screw in the first direction or the second direction by rotation of the spindle to move a relative position of the piston with respect to the power conversion unit forward or backward, and an electronic control unit provided to control an operation of the actuator, wherein the electronic control unit controls the actuator to adjust a distance d between the brake disc and the brake pad.

The adjuster may include a flange formed on an outer circumferential surface of the spindle to extend in a radial direction, and a torsion spring having one end supported on the nut and the other end supported on the flange.

An elastic force of the torsion spring may be provided to be larger than a screw fastening force between the adjusting screw and the piston.

The position adjusting unit may further include a coupling cap to couple the adjusting screw and the nut.

The adjuster may include a flange formed on an outer circumferential surface of the spindle to extend in a radial direction, a first protrusion protruding from the flange, a second protrusion protruding from the nut, and a coil spring having one end supported on the first protrusion and the other end supported on the second protrusion to provide an elastic force when the spindle rotates in the first direction.

An elastic force of the coil spring may be provided to be larger than a screw fastening force between the adjusting screw and the piston.

The adjuster may further include a third protrusion formed to protrude from the flange and to be spaced apart from the first protrusion, and the third protrusion may be caught on the second protrusion when the spindle rotates in the second direction to induce rotation of the nut in the second direction.

The position adjusting unit may further include a coupling cap to couple the adjusting screw and the nut.

In accordance with an aspect of the disclosure, an operation method of the electromechanical brake, wherein the electronic control unit controls in a first mode in which the distance d between the brake disc and the brake pad is adjusted to be a first distance d1 in a braking release state of a vehicle by controlling a rotation angle of the spindle, a second mode in which the distance d is adjusted to be a second distance d2 that is smaller than the first distance d1, and a third mode in which the distance d is adjusted to be a third distance d3 that is larger than the first distance d1.

In the first mode, when the distance d between the brake disc and the brake pad is larger than the first distance d1 in the braking release state of the vehicle, the spindle may rotate in the first direction to induce rotation of the nut and the adjusting screw in the first direction, and the relative position of the piston may move forward by the rotation of the adjusting screw in the first direction, so that the distance d between the brake disc and the brake pad may be adjusted to be the first distance d1 in the braking release state of the vehicle.

In the first mode, when the distance d between the brake disc and the brake pad is smaller than the first distance d1 in the braking release state of the vehicle, the spindle may rotate in the second direction to induce rotation of the nut and the adjusting screw in the second direction, and the relative position of the piston may move backward by the rotation of the adjusting screw in the second direction, so that the distance d between the brake disc and the brake pad may be adjusted to be the first distance d1 in the braking release state of the vehicle.

In the second mode, when the distance d between the brake disc and the brake pad is larger than the second distance d2 in the braking release state of the vehicle, the spindle may rotate in the first direction to induce rotation of the nut and the adjusting screw in the first direction, and the relative position of the piston may move forward by the rotation of the adjusting screw in the first direction, so that the distance d between the brake disc and the brake pad may be adjusted to be the second distance d2.

In the third mode, when the distance d between the brake disc and the brake pad is smaller than the third distance d3 in the braking release state of the vehicle, the spindle may rotate in the second direction to induce rotation of the nut and the adjusting screw in the second direction, and the relative position of the piston may move backward by the rotation of the adjusting screw in the second direction, so that the distance d between the brake disc and the brake pad may be adjusted to be the third distance d3.

In accordance with an aspect of the disclosure, an operation method of the electromechanical brake, wherein the electronic control unit generates rotation of the spindle in the first direction or the second direction in the braking release state of the vehicle to induce rotation of the nut and the adjusting screw in the first direction or the second direction by an elastic restoring force of the torsion spring, and moves a relative position of the piston with respect to the adjusting screw forward or backward by the rotation of the adjusting screw in the first direction or the second direction.

In accordance with an aspect of the disclosure, an operation method of the electromechanical brake, wherein the electronic control unit generates rotation of the first protrusion in the first direction or the second direction in the braking release state of the vehicle to induce rotation of the second protrusion, the nut and the adjusting screw in the first direction or the second direction by the elastic force of the coil spring, and moves a relative position of the piston with respect to the adjusting screw forward or backward by the rotation of the adjusting screw in the first direction or the second direction.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

FIG. 1 is a lateral cross-sectional view of an electromechanical brake according to a first embodiment of the disclosure.

Figure 1:
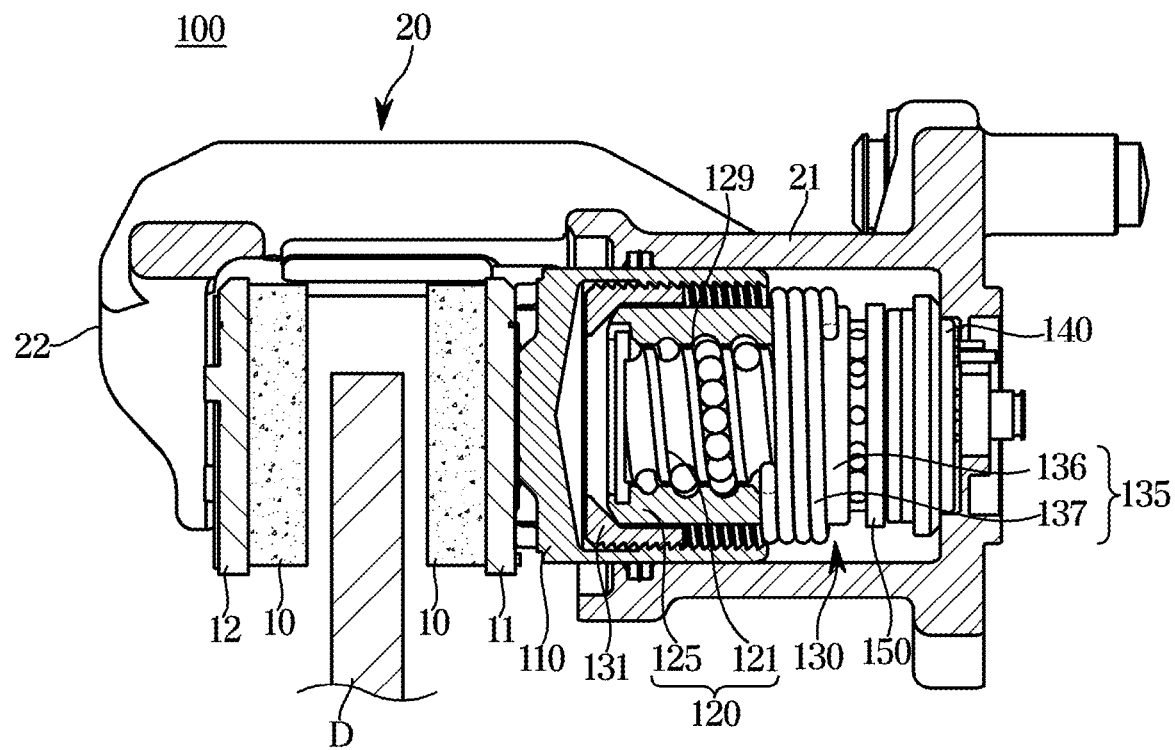
FIG. 1 is a lateral cross-sectional view of an electromechanical brake according to a first embodiment of the disclosure.

Referring to FIG. 1, an electromechanical brake 100 according to a first embodiment of the disclosure may include a carrier (not shown) on which a pair of pad plates 11 and 12 are installed to press a brake disc D rotating together with a wheel of a vehicle, a caliper housing 20 slidably installed on the carrier to operate the pair of pad plates 11 and 12, a piston 110 installed in the caliper housing 20 to move forward or backward, an actuator (not shown) provided to generate and provide a rotational driving force for moving the piston 110, a power conversion unit 120 provided to convert the rotational driving force provided by the actuator into a linear motion and transmit the linear motion to the piston 110 so that the piston 110 moves forward or backward in an axial direction, a position adjusting unit 130 provided to compensate for wear of the brake pad 10 or to reduce a drag phenomenon by adjusting a relative position of the piston 110 with respect to the power conversion unit 120, a sensor 140 provided to measure a close contact force between the brake disc D and a brake pad 10 or a fastening force between the brake disc D and the brake pad 10, and an electronic control unit (not shown) provided to control the operation of the actuator based on information provided from the sensor 140.

A brake pad 10 is attached to an inner surface of each of the pair of pad plates 11 and 12. The pair of pad plates 11 and 12, which are installed on the carrier 10 to be slidably movable, include the inner pad plate 11 having an outer surface disposed to be in contact with a front surface (left surface based on FIG. 1) of the piston 110 and the outer pad plate 12 having an outer surface disposed to be in contact with a finger part of the caliper housing 20.

The caliper housing 20 includes the finger part 22 for operating the outer pad plate 12 and a cylinder in which the piston 110 is installed, and is fastened to the carrier to be slidably movable. As the caliper housing 20 slides from the carrier to move toward the brake disc D by a reaction force caused by the movement of the piston 110 when the vehicle is braked, the outer pad plate 12 may approach the disc D by the finger part 22 to press the brake disc D.

Figure 2:
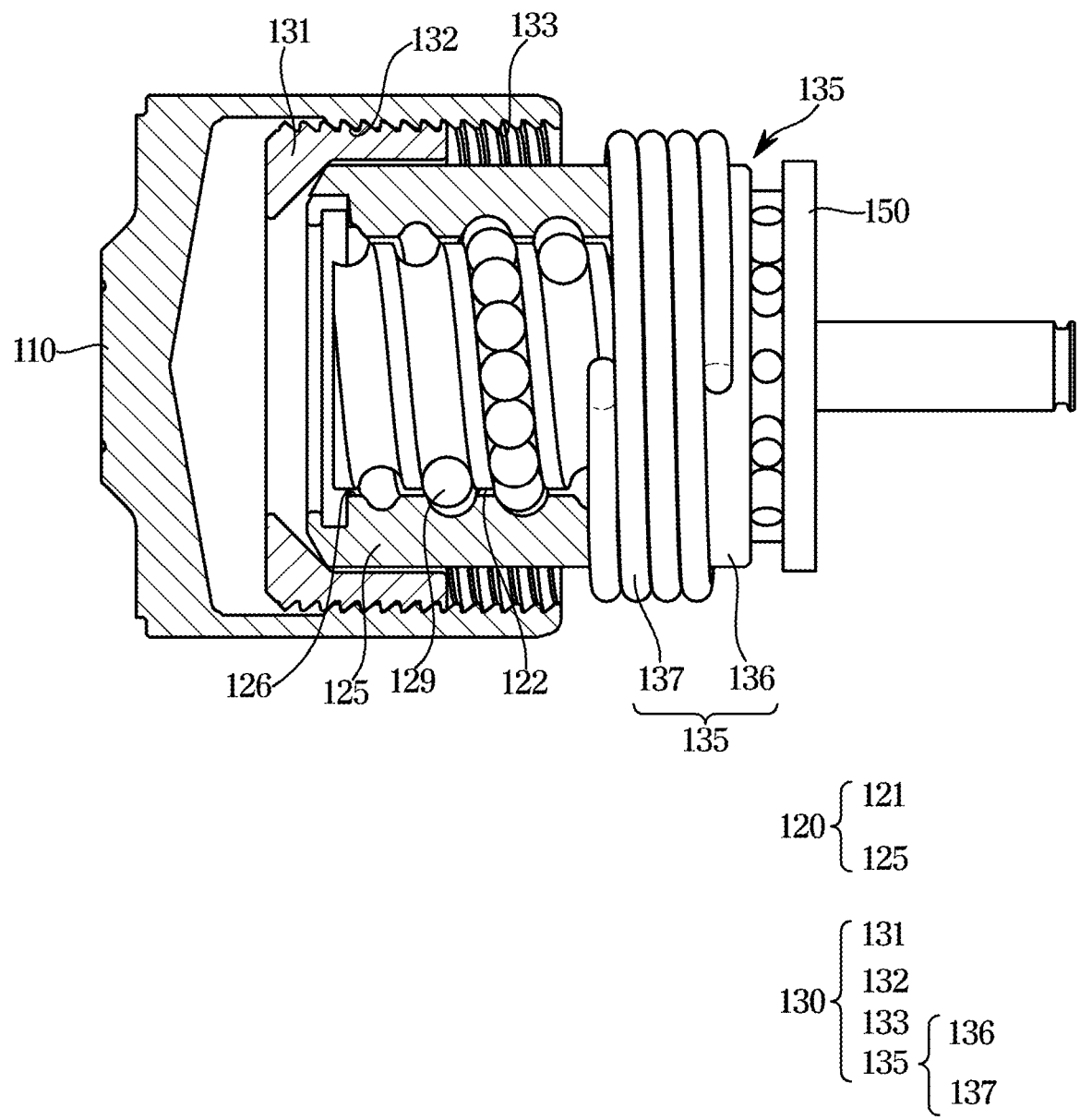
FIG. 2 is an enlarged lateral cross-sectional view of a main part of the electromechanical brake according to the first embodiment of the disclosure.
Figure 3:
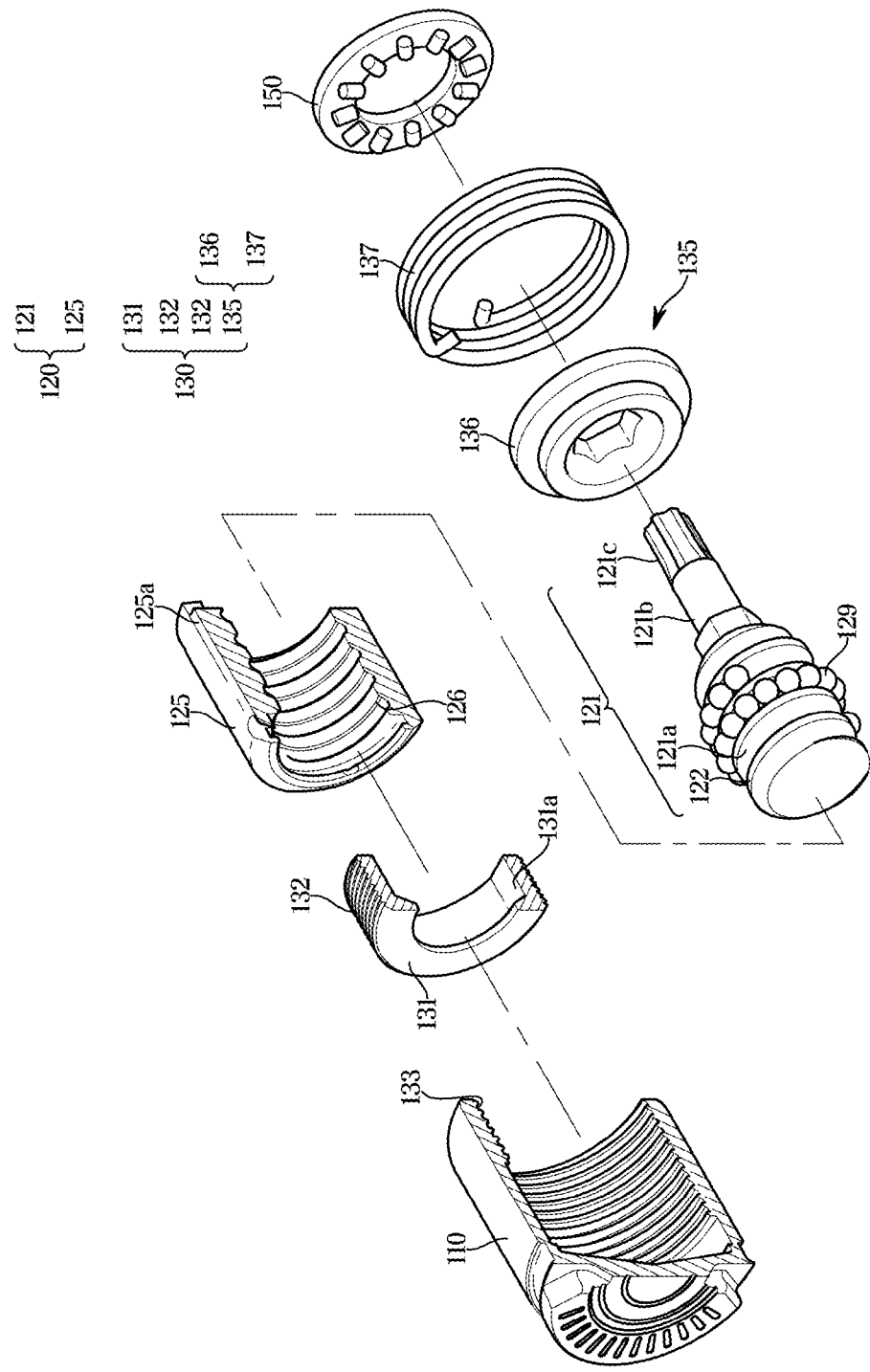
FIG. 3 is an exploded perspective view of the main part of the electromechanical brake according to the first embodiment of the disclosure.

FIGS. 2 and 3 are an enlarged lateral cross-sectional view and an exploded perspective view illustrating a main part of the electromechanical brake according to the first embodiment of the disclosure, respectively. Referring to FIGS. 1 to 3, the piston 110 may be provided in a cup shape in which a rear side (right side in FIGS. 1 and 2) is open, and is slidably inserted inside the cylinder 21. The piston 110 may receive power through the actuator and the power conversion unit 120, which will be described later, and press the inner pad plate 11 toward the brake disc D, and a second screw thread 133, which is engaged with a first screw thread 132 formed on an outer circumferential surface of an adjusting screw 131, which will be described later, may be formed on an inner circumferential surface of the piston 110. An operation of adjusting the relative position of the piston 110 with respect to a spindle 121 or a nut 125 by the position adjusting unit 130 will be described later with reference to FIGS. 4 and 5.

The power conversion unit 120 includes a spindle 121 provided to rotate by receiving a driving force from the actuator, a nut 125 disposed inside the piston 110 and screwed to the spindle 121 to move forward together with the piston 110 by rotation of the spindle 121 in a first direction or move backward together with the piston 110 by rotation of the spindle 121 in a second direction, and a plurality of balls (not shown) interposed between the spindle 121 and the nut 125. The power conversion unit 120 as described above may be provided as a ball-screw type converter for converting a rotational motion of the spindle 121 into a linear motion.

Hereinafter, the rotation of the spindle 121 in the first direction refers to a rotation direction of moving the nut 125 forward by the rotation of the spindle 121, and the rotation of the spindle 121 in the second direction opposite to the first direction refers to a rotation direction of moving the nut 125 backward by the rotation of the spindle 121.

The spindle 121 may include a first end 121a of one side in which an external thread 122 is formed on an outer circumferential surface, a second end 121c of the other side connected to the actuator to receive a driving force, and a central portion 121b disposed between the first end 121a and the second end 121c to which a flange 136, which will be described later, is fixed. The first end 121a of the spindle 121 may be inserted into the inside of the nut 125, and a bearing 150 for smooth rotation of the flange 136, which will be described later, and the sensor 140 for measuring a fastening force between the brake disc D and the brake pad 10 by detecting a load applied to the spindle 121 may be disposed on the second end 121c.

The nut 125 may be formed in a hollow cylindrical shape such that the first end 121a of the spindle 121 is inserted therein, and an internal thread 126 that is engaged with the external thread 122 of the spindle 121 through the balls (not shown) may be formed on an inner circumferential surface of the nut 125. The adjusting screw 131, which will be described later, may be provided on the outside of the nut 125 to surround at least a portion of an outer circumferential surface of the nut 125, and a rotation preventing surface 125a in which at least a portion thereof is formed as a flat surface may be provided on the outer circumferential surface of the nut 125 to prevent relative rotation with the adjusting screw 131. Because the ball-screw type power conversion unit 120 is a well-known technology that is already widely applied, a detailed description of its operation will be omitted.

The actuator (not shown) may include a position sensor (not shown) for measuring a rotation angle of the spindle 121, and a distance between the brake pad 10 and the brake disc may be adjusted by controlling the spindle based on the rotation angle measured by the position sensor (not shown).

The actuator (not shown) may include a motor and a reduction device having a plurality of reduction gears and may receive power from a power supply device disposed in the vehicle to generate and provide a driving force. The actuator may be connected to the second end 121c of the spindle 121 to transmit the generated driving force to the spindle 121, thereby rotating the spindle 121. The actuator may be installed on the outside of the caliper housing 20, and the reduction device may be provided in various structures such as a planetary gear assembly and a worm structure to reduce the power of the motor and provide the reduced power to the spindle 121.

The position adjusting unit 130 is provided to move the relative position of the piston 110 forward in order to compensate for wear of the brake pad 10 by adjusting the relative position of the piston 110 with respect to the power conversion unit 120 or to move the relative position of the piston 110 backward in order to reduce the drag phenomenon.

In addition, the position adjusting unit 130 is provided to adjust a distance d between the brake disc D and the brake pad 10 by adjusting the relative position of the piston 110 with respect to the power conversion unit 120 in a state in which the braking is released, thereby adjusting braking response performance.

The position adjusting unit 130 may include the adjusting screw 131 provided on the outside of the nut 125 to rotate together with the nut 125, the first screw thread 132 formed on the outer circumferential surface of the adjusting screw 131, the second screw thread 133 formed on the inner circumferential surface of the piston 110 to be engaged with the first screw thread 132, and an adjuster 135 provided between the spindle 121 and the nut 125 to compress or expand depending on a rotation amount of the spindle 121 to move the relative position of the piston 110 forward by rotating the nut 125 and the adjusting screw 131 in the first direction or to move the relative position of the piston 110 backward by rotating the nut 125 and the adjusting screw 131 in the second direction opposite to the first direction.

The rotation in the first direction of the nut 125 or the adjusting screw 131, which will be described below, is the same as the rotation in the first direction of the spindle 121 described above, and refers to rotation in a direction of moving the piston 110 forward by the rotation of the adjusting screw 131. Also, the rotation in the second direction of the nut 125 or the adjusting screw 131, which is a rotation in a direction opposite to the first direction, is the same as the rotation in the second direction of the spindle 121 described above, and refers to rotation in a direction of moving the piston 110 backward by the rotation of the adjusting screw 131.

The adjusting screw 131 is provided to surround a front portion of the nut 125, and the first screw thread 132 is formed on the outer circumferential surface thereof. A rotation preventing surface 131a in which at least a portion of an inner circumferential surface in contact with the nut 125 is formed as a flat surface may be formed on the adjusting screw 131 to prevent relative rotation while rotating together with the nut 125. When the nut 125 is rotated by an adjuster 135, which will be described later, the adjusting screw 131 may transmit a rotational force of the nut 125 to the piston 110 while rotating together with the nut 125. As the adjusting screw 131 is provided to be interposed between the nut 125 and the piston 110, the adjusting screw 131 may absorb a load generated when the nut 125 and the piston 110 come into contact with each other, so that deformation and wear of components such as the nut 125 and the piston 110 to which a large load is applied may be prevented.

The first screw thread 132 may be formed on the outer circumferential surface of the adjusting screw 131, the second screw thread 133 may be formed on the inner circumferential surface of the piston 110, and the first screw thread 132 and the second screw thread 133 are provided to be engaged with each other. As such, because the adjusting screw 131 and the piston 110 that rotate and linearly move together with the nut 125 are screw-coupled to each other, the nut 125, the adjusting screw 131, and the piston 110 linearly move together, so that the nut 125, the adjusting screw 131, and the piston 110 may move forward together during braking of a general vehicle or may move backward together during braking release of the general vehicle. At the same time, as the piston 110 and the adjusting screw 131 may rotate relative to each other, the piston 110 may move forward relative to the nut 125 or the spindle 121 by the rotation of the nut 125 and the adjusting screw 131 in the first direction, and the piston 110 may move backward relative to the nut 125 or the spindle 121 by the rotation of the nut 125 and the adjusting screw 131 in the second direction opposite to the first direction.

The adjuster 135 may generate rotation of the nut 125 and the adjusting screw 131 to move the relative position of the piston 110 with respect to the nut 125 or the spindle 121 forward or backward. The adjuster 135 may include the flange 136 fixed to the central portion 121b of the spindle 121 and formed to expand in a radial direction, and a torsion spring 137 provided between the nut 125 and the flange 136 to elastically support the nut 125 with respect to the flange 136 and inducing rotation of the nut 125 and the adjusting screw in the first direction or the second direction by compressing or expanding in its original form when the spindle 121 or the flange 136 exceeds a preset rotation amount.

The flange 136 is formed at the central portion 121b of the spindle 121 to extend in the radial direction and fixed to the spindle 121 to rotate integrally with the spindle 121. The bearing 150 for facilitating smooth rotation of the flange 136 and preventing wear between the flange 136 and surrounding components may be provided on a rear surface (right side based on FIG. 2) of the flange 136.

The torsion spring 137 may be provided such that one end thereof is inserted into and fixed to the outer circumferential surface of the nut 125 and the other end thereof is inserted into and fixed to the flange 136. When the spindle 121 rotates within the preset rotation amount, for example, within a rotation amount of the spindle 121 between the braking release state and the braking state of the vehicle (a state in which the brake disc D and the brake pad 10 are spaced apart from each other), the torsion spring 137 maintains its original shape by its elastic restoring force to induce rotation of the nut 125 and the adjusting screw 131 in the first direction or the second direction. When the spindle 121 rotates in excess of the preset rotation amount, for example, in a rotation amount of the spindle 121 in the braking state of the vehicle (a state in which friction is generated between the brake disc D and the brake pad 10), the torsion spring 137 may allow rotation of the spindle 121 in the first direction or the second direction relative to the nut 125 by being compressed or expanded, and moves the relative position of the nut 125 with respect to the spindle 121 forward or backward. Hereinafter, the state in which the brake disc D and the brake pad 10 are spaced apart from each other (see FIG. 4) is referred to as a no-load section, and the state in which friction is generated between the brake disc D and the brake pad 10 (see FIG. 5) is referred to as a load section. The no-load section may include a state before the brake is operated, or a state of being switched from the braking release state to the braking state, or a state in which the brake disc D and the brake pad 10 are spaced apart from each other and returned to their original positions after being switched from the braking state to the braking release state. The load section may include a state in which friction is generated between the brake pad 10 and the brake disc D in a braking process of the brake to be pressed, or a state in which friction is generated between the brake pad 10 and the brake disc D in a braking release process of the brake to be released.

In the no-load section, the elastic restoring force of the torsion spring 137 by the rotation amount of the spindle 121 in the first direction may be provided to be larger than a screw fastening force between the adjusting screw 131 and the piston 110. Accordingly, when the spindle 121 and the flange 136 rotate in the first direction, the nut 125 and the adjusting screw 131 rotate together in the first direction by the elastic restoring force of the torsion spring 137, and thus the piston 110 moves forward relative to the nut 125 and the adjusting screw 131 (see FIG. 4).

Similarly, in the no-load section, the elastic restoring force of the torsion spring 137 by the rotation amount of the spindle 121 in the second direction may be provided to be larger than the screw fastening force between the adjusting screw 131 and the piston 110. Accordingly, when the spindle 121 and the flange 136 rotate in the second direction, the nut 125 and the adjusting screw 131 rotate together in the second direction by the elastic restoring force of the torsion spring 137, and thus the piston 110 moves backward relative to the nut 125 and the adjusting screw 131.

Therefore, by adjusting the relative position of the piston 110 through the control of the actuator in the no-load section, the gap d between the brake disc D and the brake pad 10 may be adjusted when the braking is released, and the braking response performance of the brake may be adjusted.

Because a load is generated by friction between the brake pad 10 and the brake disc D in the load section, the elastic restoring force of the torsion spring 137 by the rotation amount of the spindle 121 in the first direction is provided to be smaller than the screw fastening force between the adjusting screw 131 and the piston 110. Accordingly, as the spindle 121 rotates, the torsion spring 137 may expand in the axial direction, and the relative positions of the nut 125, the adjusting screw 131, and the piston 110 with respect to the spindle 121 may move forward (see FIG. 5).

Similarly, because a load is generated by friction between the brake pad 10 and the brake disc D when the spindle 121 rotates in the second direction in the load section, the elastic restoring force of the torsion spring 137 by the rotation amount of the spindle 121 in the second direction is provided to be smaller than the screw fastening force between the adjusting screw 131 and the piston 110. Accordingly, as the spindle 121 rotates, the torsion spring 137 is compressed, and the relative positions of the nut 125, the adjusting screw 131, and the piston 110 with respect to the spindle 121 moves backward.

After the nut 125 and the piston 110 move forward for braking the vehicle so that the brake disc D and the brake pad 10 come into close contact with each other, when the actuator malfunctions or the power supply is cut off, it is necessary to self-release the braking of the vehicle for the safety of passengers. Accordingly, the torsion spring 137 is expanded in the axial direction by the rotation of the spindle 121 and the flange 136 in the first direction when the vehicle is braked, and when the operation of the actuator is stopped or the power supply is cut off, the spindle 121 may rotate in the second direction by the elastic restoring force of the torsion spring 137, so that the nut 125 and the adjusting screw 131 may move backward to release the braking of the vehicle.

The sensor 140 is provided to measure the close contact force or fastening force between the brake disc D and the brake pad 10. The sensor 140 may be provided as a force sensor that detects the load of the spindle 121 or the actuator and measures the fastening force between the brake disc D and the brake pad 10, but is limited thereto. The sensor 140 transmits information on the measured fastening force of the brake pad 10 to the electronic control unit, and the electronic control unit may determine the wear or drag of the brake pad 10 based on the information on the fastening force measured by the sensor 140.

Hereinafter, an operation method of the electromechanical brake 100 system according to the first embodiment of the disclosure will be described.

Figure 4:
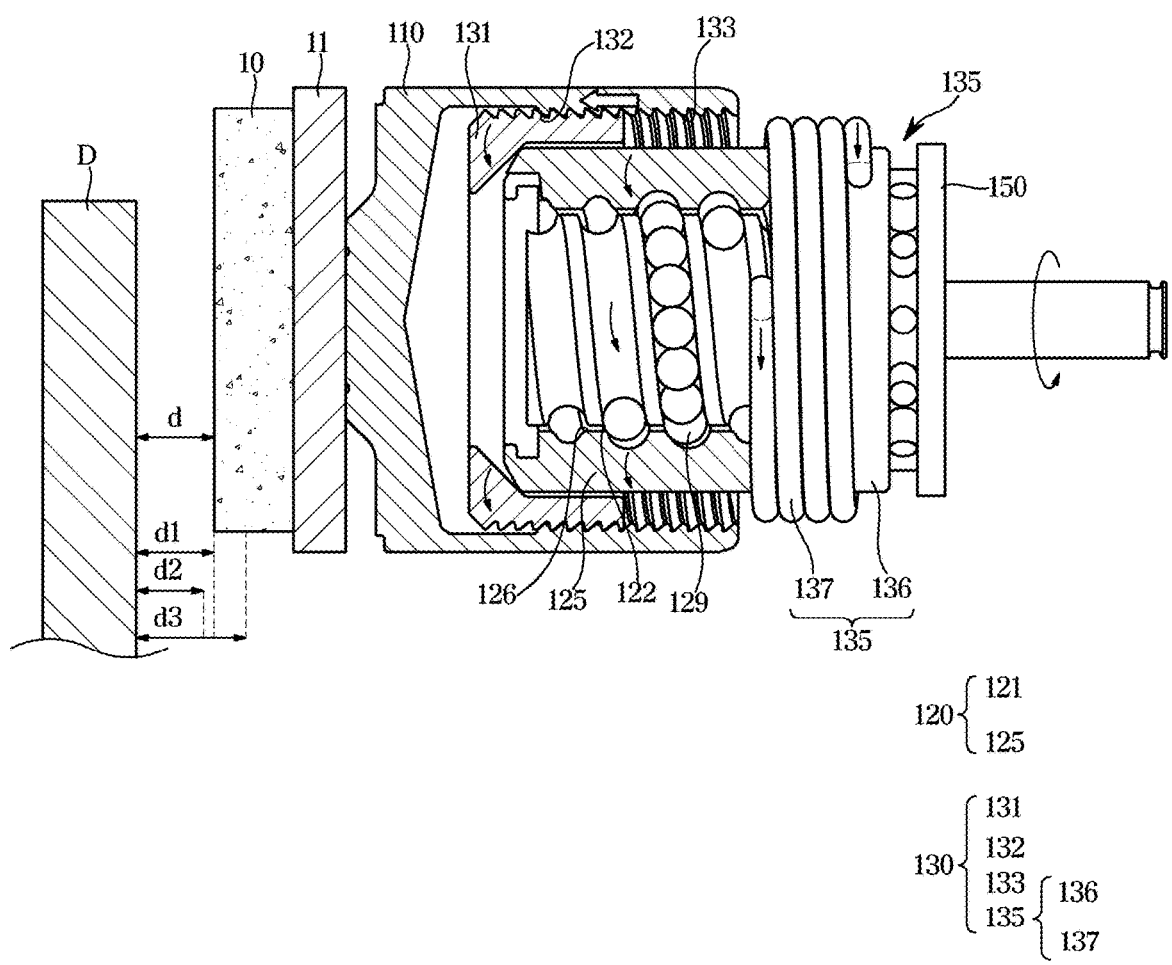
FIG. 4 is a lateral cross-sectional view illustrating an operation of the electromechanical brake according to the first embodiment of the disclosure in a state in which a brake disc and a brake pad are spaced apart from each other during braking of a vehicle.
Figure 5:
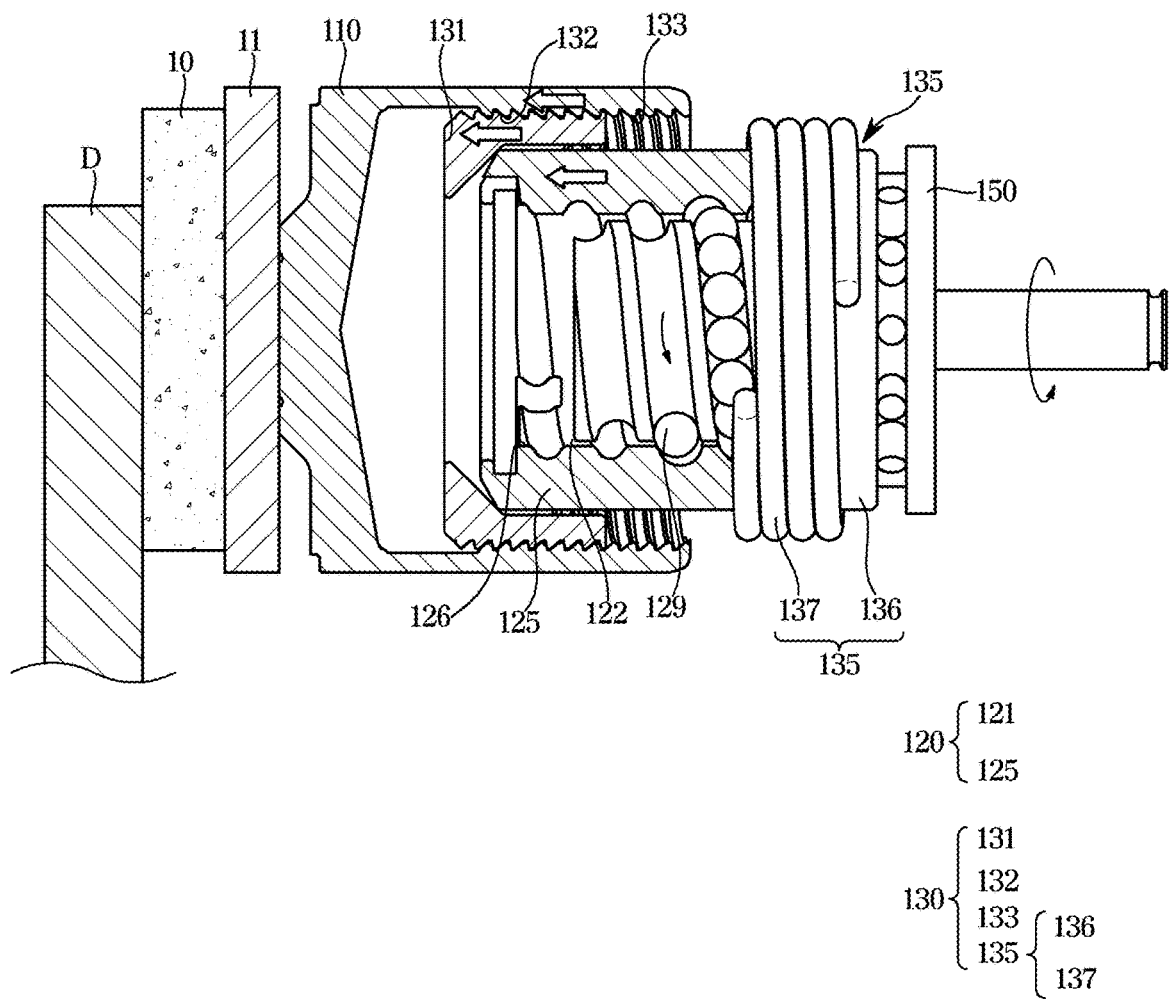
FIG. 5 is a lateral cross-sectional view illustrating an operation of the electromechanical brake according to the first embodiment of the disclosure in a state in which friction is generated between the brake disc and the brake pad during braking of the vehicle.

FIG. 4 is a lateral cross-sectional view illustrating an operation of the electromechanical brake 100 according to the first embodiment of the disclosure in a state in which the brake disc D and the brake pad 10 are spaced apart from each other during braking of a vehicle, and FIG. 5 is a lateral cross-sectional view illustrating an operation of the electromechanical brake 100 according to the first embodiment of the disclosure in a state in which friction is generated between the brake disc D and the brake pad 10 during braking of the vehicle. Referring to FIGS. 2, 4 and 5, in a general braking such as a service brake of a vehicle, the electromechanical brake 100 may operate to switch to the braking state from the braking release state which is illustrated in FIG. 2 and the braking release state in the no-load section which is illustrated in FIG. 4, and then operate to press the brake disc D by generating friction between the brake pad 10 and the brake disc D in the braking process of the brake in the load section illustrated in FIG. 5.

First, when a driver presses a brake pedal (not shown) to brake the vehicle, a pedal displacement sensor (not shown) detects a braking intention of the driver as an electric signal and transmits the detected electric signal to the electronic control unit. Based on this, the electronic control unit may control the operation of the actuator so that the brake pad 10 comes into close contact with the brake disc D to perform braking of the vehicle.

When the vehicle is braked, the spindle 121 rotates in the first direction by the operation of the actuator, and by the rotation of the spindle 121, the piston 110 presses the pad plate 10 to generate friction between the brake pad 10 and the brake disc D, so that the braking is performed. At this time, the braking operation is performed by sequentially reaching from the no-load section in which the brake pad 10 is spaced apart from the brake disc D to the load section in which the brake pad 10 is in close contact with the brake disc D.

Referring to FIG. 4, the spindle 121 rotates in the first direction by the operation of the actuator during the braking operation in the no-load section, and the nut 125 and the adjusting screw 131 rotate in the first direction together with the spindle 121 by the elastic restoring force of the torsion spring 137 so that the relative position of the piston 110 moves forward. Accordingly, the piston 110 moves forward to press the pad plate 11, and the distance d between the brake disc D and the brake pad 10 is gradually shortened, and then the brake pad 10 come into close contact with the brake disc D.

Referring to FIG. 5, during the braking operation in the load section, a load is generated due to friction between the brake pad 10 and the brake disc D, the elastic restoring force of the torsion spring 137 is provided to be smaller than the screw fastening force between the adjusting screw 131 and the piston 110. Accordingly, when the spindle 121 rotates in the first direction in the load section, the torsion spring 137 expands in the axial direction, the relative positions of the nut 125 and the adjusting screw 131 with respect to the spindle 121 move forward, and the piston 110 moves forward. As the piston 110 moves forward, the pad plate 11 is further pressed, and the brake pad 10 further presses the brake disc D in a state of being in close contact with the brake disc D to increase the braking force.

During the braking release of the vehicle, the spindle 121 rotates in the second direction by the operation of the actuator, the piston 110 moves backward by the rotation of the spindle 121 to release the pressing of the pad plate 10, and the brake pad 10 is spaced apart from the brake disc D, so that the braking release is performed. At this time, the braking release operation is performed by sequentially reaching from the load section in which the brake pad 10 is in close contact with the brake disc D to the no-load section in which the brake pad 10 is spaced apart from the brake disc D.

During the braking release operation in the load section, a load is generated due to friction between the brake pad 10 and the brake disc D, and the elastic restoring force of the torsion spring 137 is provided to be smaller than the screw fastening force between the adjusting screw 131 and the piston 110. Accordingly, when the spindle 121 rotates in the second direction by the operation of the actuator in the bad section, the torsion spring 137 is compressed in the axial direction, the relative positions of the nut 125 and the adjusting screw 131 with respect to the spindle 121 move backward, and the piston 110 moves backward. As the piston 110 moves backward, the pressing of the pad plate 11 is rebased, the pressing of the brake pad 10 to the brake disc D is gradually released from the state of being in close contact with each other to decrease the braking force.

During the braking rebase operation in the no-bad section, the spindle 121 rotates in the second direction by the operation of the actuator, the nut 125 and the adjusting screw 131 rotate in the second direction together with the spindle 121 by the elastic restoring force of the torsion spring 137, so that the relative position of the piston 110 moves backward. Accordingly, the piston 110 moves backward to completely rebase the pressing of the pad plate 11, and the distance d between the brake disc D and the brake pad 10 gradually increases.

An electromechanical brake according to a second embodiment of the disclosure described below is the same as the electromechanical brake 100 according to the first embodiment described above except for the content in which reference numbers are additionally designated and additionally described. Therefore, a description of the redundant content will be omitted.

Figure 6:
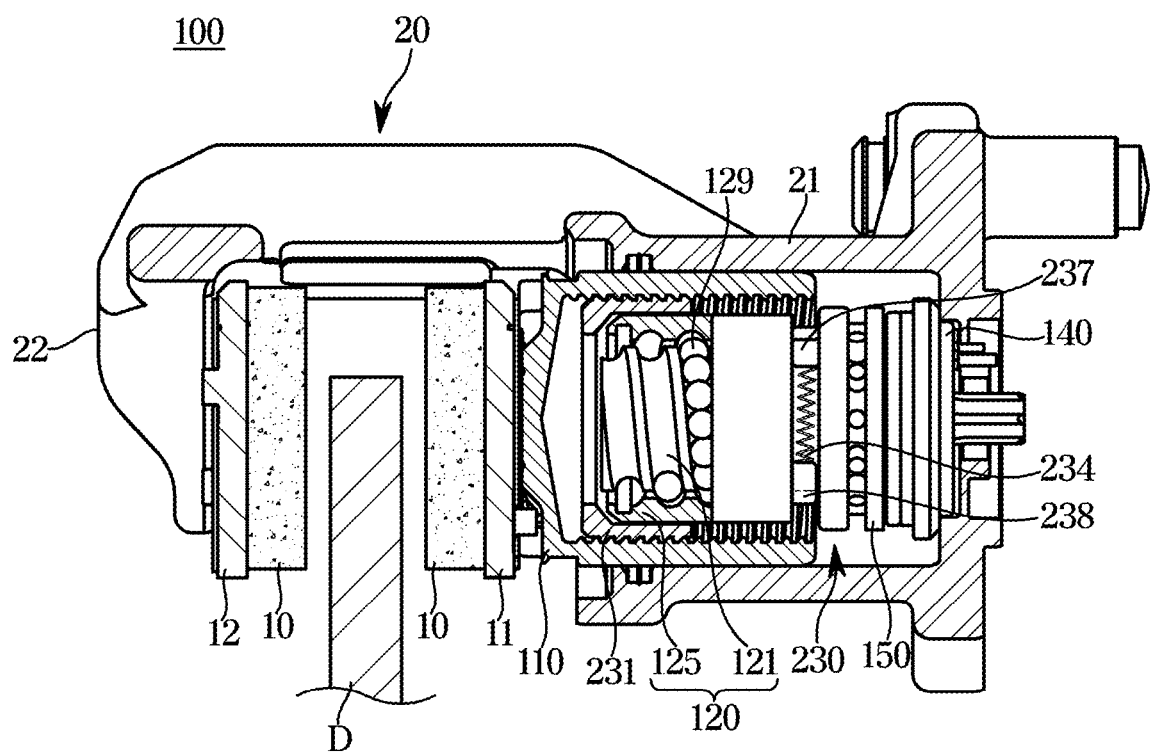
FIG. 6 is a lateral cross-sectional view of an electromechanical brake according to a second embodiment of the disclosure.
Figure 7:
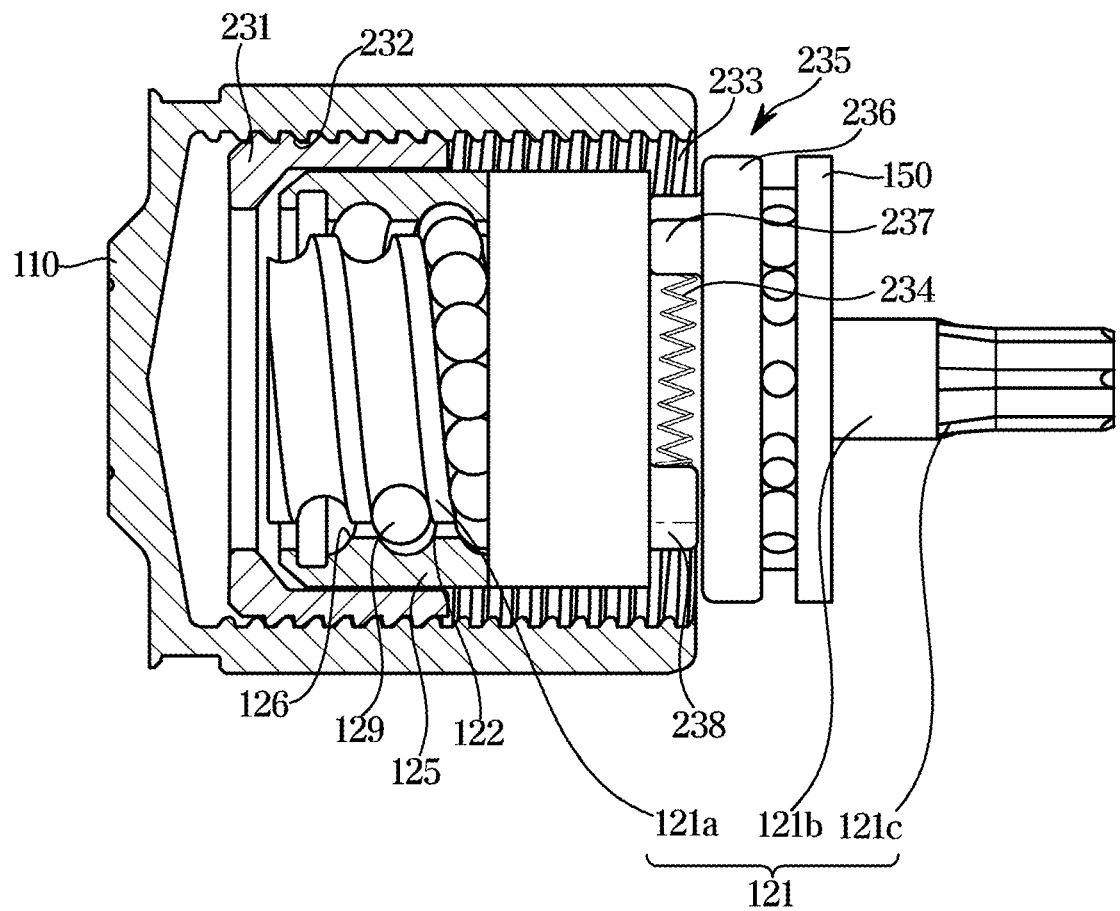
FIG. 7 is an enlarged lateral cross-sectional view of a main part of the electromechanical brake according to the second embodiment of the disclosure.
Figure 8:
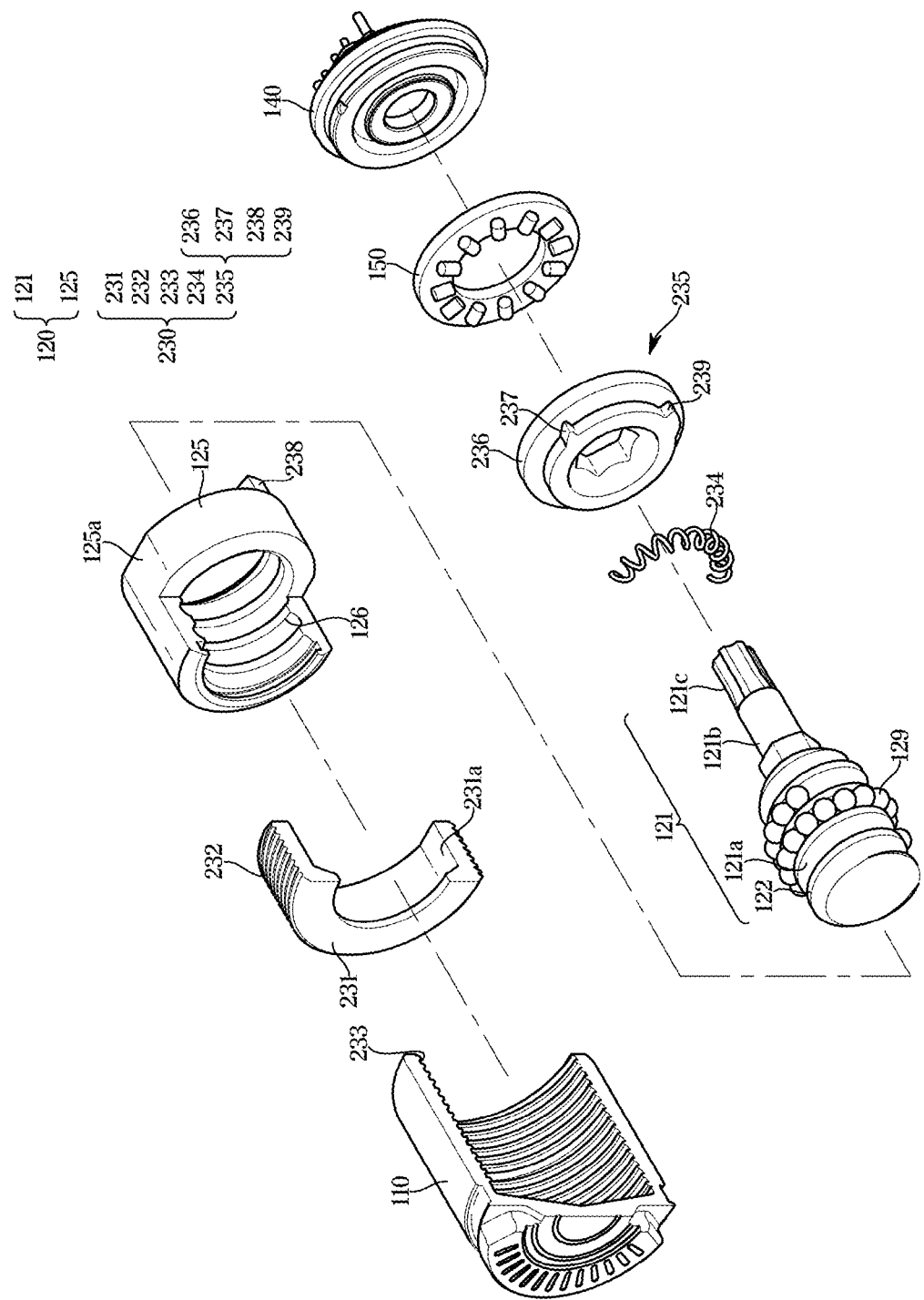
FIG. 8 is an exploded perspective view of the main part of the electromechanical brake according to the second embodiment of the disclosure.

FIG. 6 is a lateral cross-sectional view of the electromechanical brake 100 according to a second embodiment of the disclosure, and FIGS. 7 and 8 are an enlarged lateral cross-sectional view and an exploded perspective view of a main part of the electromechanical brake 100 according to the second embodiment of the disclosure, respectively.

A position adjusting unit 230 is provided to move the relative position of the piston 110 forward in order to compensate for the wear of the brake pad 10 by adjusting the relative position of the piston 110 with respect to the power conversion unit 120 or to move the relative position of the piston 110 backward in order to reduce the drag phenomenon.

In addition, the position adjusting unit 230 is provided to adjust the distance d between the brake disc D and the brake pad 10 by adjusting the relative position of the piston 110 with respect to the power conversion unit 120 in a state in which the braking is released, thereby adjusting the braking response performance.

The position adjusting unit 230 may include a adjusting screw 231 provided on the outside of the nut 125 and to rotate together with the nut 125, a first screw thread 232 formed on an outer circumferential surface of the adjusting screw 231, a second screw thread 233 formed on the inner circumferential surface of the piston 110 to be engaged with the first screw thread 232, and an adjuster 235 provided between the spindle 121 and the nut 125 to compress or expand depending on a rotation amount of the spindle 121 to move the relative position of the piston 110 forward by rotating the nut 125 and the adjusting screw 231 in the first direction or to move the relative position of the piston 110 backward by rotating the nut 125 and the adjusting screw 231 in the second direction opposite to the first direction.

The rotation in the first direction of the nut 125 or the adjusting screw 231, which will be described below, is the same as the rotation in the first direction of the spindle 121 described above, and refers to rotation in a direction of moving the piston 110 forward by the rotation of the adjusting screw 231. Also, the rotation in the second direction of the nut 125 or the adjusting screw 231, which is the rotation in a direction opposite to the first direction, is the same as the rotation in the second direction of the spindle 121 described above, and refers to rotation in the direction of moving the piston 110 backward by the rotation of the adjusting screw 231.

The adjusting screw 231 is provided to surround the front portion of the nut 125, and a first screw thread 232 is formed on an outer circumferential surface thereof. A rotation preventing surface 231a in which at least a portion of an inner circumferential surface in contact with the nut 125 is formed as a flat surface may be formed on the adjusting screw 231 to prevent relative rotation while rotating together with the nut 125. When the nut 125 is rotated by an adjuster 235, which will be described later, the adjusting screw 231 may transmit the rotational force of the nut 125 to the piston 110 while rotating together with the nut 125. As the adjusting screw 231 is provided to be interposed between the nut 125 and the piston 110, the adjusting screw 231 may absorb a load generated when the nut 125 and the piston 110 come into contact with each other, so that deformation and wear of components such as the nut 125 and the piston 110 to which a large load is applied may be prevented.

The first screw thread 232 may be formed on the outer circumferential surface of the adjusting screw 231, the second screw thread 233 may be formed on the inner circumferential surface of the piston 110, and the first screw thread 232 and the second screw thread 233 are provided to be engaged with each other. As such, because the adjusting screw 231 and the piston 110 that rotate and linearly move together with the nut 125 are screw-coupled to each other, the nut 125, the adjusting screw 231, and the piston 110 linearly move together, so that the nut 125, the adjusting screw 231, and the piston 110 may move forward together during braking of a general vehicle or may move backward together during braking release of the general vehicle. At the same time, as the piston 110 and the adjusting screw 231 may rotate relative to each other, the piston 110 may move forward relative to the nut 125 or the spindle 121 by the rotation of the nut 125 and the adjusting screw 231 in the first direction, and the piston 110 may move backward relative to the nut 125 or the spindle 121 by the rotation of the nut 125 and the adjusting screw 231 in the second direction opposite to the first direction.

The adjuster 235 may generate rotation of the nut 125 to move the relative position of the piston 110 with respect to the nut 125 forward or backward. The adjuster 235 may include the flange 236 fixed to the central portion 121b of the spindle 121 and formed to expand in the radial direction, a first protrusion 237 formed to protrude from a front surface (left side based on FIG. 7) of the flange 236, a second protrusion 238 formed to protrude from a rear surface (right side based on FIG. 7) of the nut 125 and provided to induce and generate the rotation of the nut 125 in the first direction by the first protrusion 237 and a coil spring when the spindle 121 rotates in the first direction, and a third protrusion 239 formed to protrude from the front surface of the flange 236 and provided to induce and generate the rotation of the nut 125 in the second direction by being caught on the second protrusion 238 when the spindle 121 rotates in the second direction.

The flange 236 is formed at the central portion 121b of the spindle 121 to extend in the radial direction and fixed to the spindle 121 to rotate integrally with the spindle 121. The first protrusion 237 and the third protrusion 239, which will be described later, may protrude from the front surface of the flange 236 (the left side based on FIG. 7) to be spaced apart from each other at a predetermined angle, and the bearing 150 for facilitating smooth rotation of the flange 236 and preventing wear between the flange 236 and surrounding components may be provided on a rear surface (right side based on FIG. 7) of the flange 236.

The first and third protrusions 237 and 239 may protrude on the front surface (left side based on FIG. 7) of the flange 236 facing the nut 125 to rotate together with the flange 236 about the spindle 121 as an axis when the spindle 121 rotates, and the second protrusion 238 may protrude from the rear surface (right side based on FIG. 7) of the nut 125 facing the flange 236 to induce rotation of the nut 125 by being caught on the first protrusion 237 or the third protrusion 239.

A coil spring 234 may be provided between the first protrusion 237 and the second protrusion 238.

The coil spring 234 may have one end supported by the first protrusion 237 and the other end supported by the second protrusion 238 to provide an elastic force when the spindle 121 rotates in the first direction or in the second direction.

When the spindle 121 rotates within the preset rotation amount, for example, within the rotation amount of the spindle 121 between the braking release state and the braking state of the vehicle (the state in which the brake disc D and the brake pad 10 are spaced apart from each other), the coil spring 234 induces rotation of the nut 125 and the adjusting screw 131 in the first direction or the second direction by its elastic force. When the spindle 121 rotates in excess of the preset rotation amount, for example, in the rotation amount of the spindle 121 in the braking state of the vehicle (the state in which friction is generated between the brake disc D and the brake pad 10), the coil spring 234 may allow rotation of the spindle 121 in the first direction or the second direction relative to the nut 125 by being compressed or expanded, and moves the relative position of the nut 125 with respect to the spindle 121 forward or backward.

Hereinafter, the state in which the brake disc D and the brake pad 10 are spaced apart from each other (see FIG. 9) is referred to as the no-load section, and the state in which friction is generated between the brake disc D and the brake pad 10 (see FIG. 10) is referred to as the load section. The no-load section may include the state before the brake is operated, or the state of being switched from the braking release state to the braking state, or the state in which the brake disc D and the brake pad 10 are spaced apart from each other and returned to theft original positions after being switched from the braking state to the braking release state. The load section may include the state in which friction is generated between the brake pad 10 and the brake disc D in the braking process of the brake to be pressed, or the state in which friction is generated between the brake pad 10 and the brake disc D in the braking release process of the brake to be released.

In the no-load section, the elastic force of the coil spring 234 by the rotation amount of the spindle 121 in the first direction may be provided to be larger than the screw fastening force between the adjusting screw 131 and the piston 110. Accordingly, when the spindle 121 and the first protrusion 237 rotate in the first direction, the nut 125 and the adjusting screw 231 rotate together in the first direction as the second protrusion 238 is pressed by the elastic force of the coil spring 234, and thus the piston 110 moves forward relative to the nut 125 and the adjusting screw 231 (see FIG. 9).

Similarly, in the no-load section, the elastic force of the coil spring 234 by the rotation amount of the spindle 121 in the second direction may be provided to be larger than the screw fastening force between the adjusting screw 231 and the piston 110. Accordingly, when the spindle 121 and the first protrusion 237 rotate in the second direction, the second protrusion 238, the nut 125 and the adjusting screw 231 rotate together in the second direction by the elastic force of the coil spring 234, and thus the piston 110 moves backward relative to the nut 125 and the adjusting screw 231.

Therefore, by adjusting the relative position of the piston 110 through the control of the actuator in the no-load section, the gap d between the brake disc D and the brake pad 10 may be adjusted when the braking is released, and the braking response performance of the brake may be adjusted.

In the load section, a load is generated by friction between the brake pad 10 and the brake disc D, and the elastic force of the coil spring 234 by the rotation amount of the spindle 121 in the first direction is provided to be smaller than the screw fastening force between the adjusting screw 231 and the piston 110. Accordingly, when the spindle 121 rotates in the first direction, the first protrusion 237 rotates toward the second protrusion 238 so that the coil spring 234 may be compressed, and the relative positions of the nut 125, the adjusting screw 231, and the piston 110 with respect to the spindle 121 may move forward (see FIG. 5).

Similarly, when the spindle 121 rotates in the second direction in the load section, a load is generated by friction between the brake pad 10 and the brake disc D, and the elastic force of the coil spring 234 by the rotation amount of the spindle 121 in the second direction is provided to be smaller than the screw fastening force between the adjusting screw 231 and the piston 110. Accordingly, as the spindle 121 rotates in the second direction, the first protrusion 237 rotates in a direction of being spaced apart from the second protrusion 238 so that the coil spring 234 is expanded, and the relative positions of the nut 125, the adjusting screw 231, and the piston 110 with respect to the spindle 121 moves backward.

After the nut 125 and the piston 110 move forward for braking the vehicle so that the brake disc D and the brake pad 10 come into close contact with each other, when the actuator malfunctions or the power supply is cut off, it is necessary to self-release the braking of the vehicle for the safety of passengers. Accordingly, the coil spring 234 is compressed by the rotation of the spindle 121 and the flange 236 in the first direction when the vehicle is braked, and when the operation of the actuator is stopped or the power supply is cut off, the spindle 121 may rotate in the second direction by the elastic force of the compressed coil spring 234, so that the nut 125 and the adjusting screw 231 may move backward to release the braking of the vehicle.

Hereinafter, an operation method of the electromechanical brake 100 according to the second embodiment of the disclosure will be described.

Figure 9:
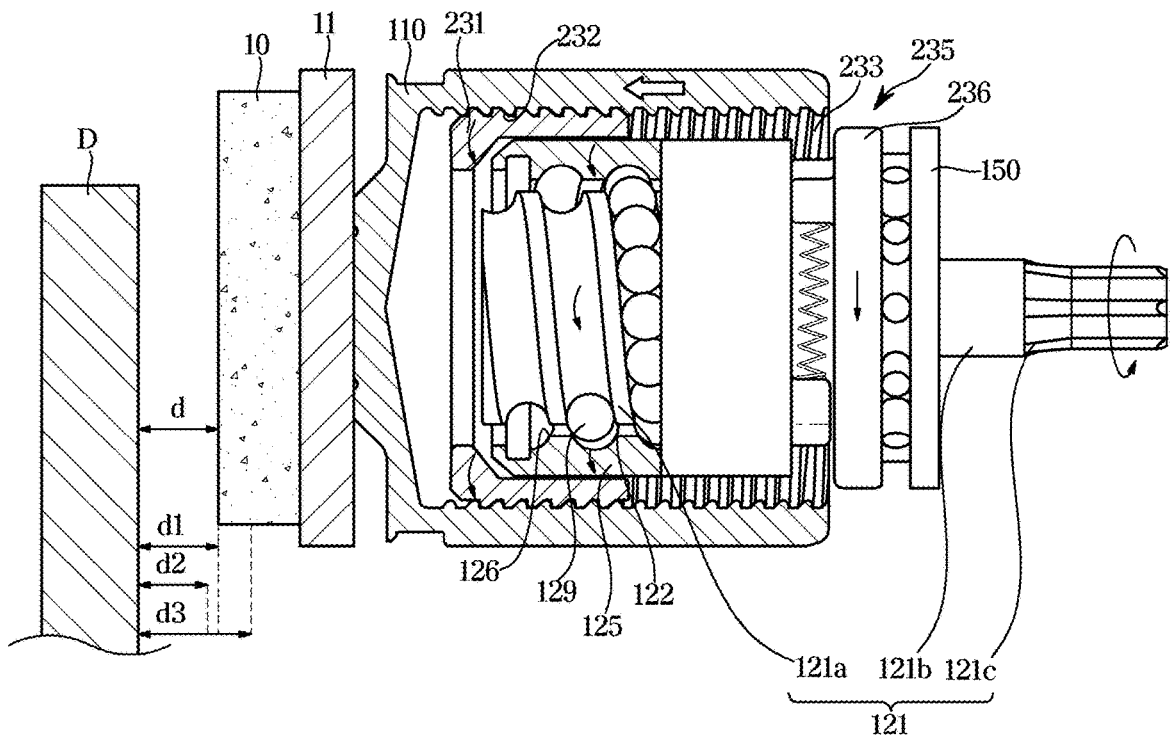
FIG. 9 is a lateral cross-sectional view illustrating an operation of the electromechanical brake according to the second embodiment of the disclosure in a state in which the brake disc and the brake pad are spaced apart from each other during braking of the vehicle.
Figure 10:
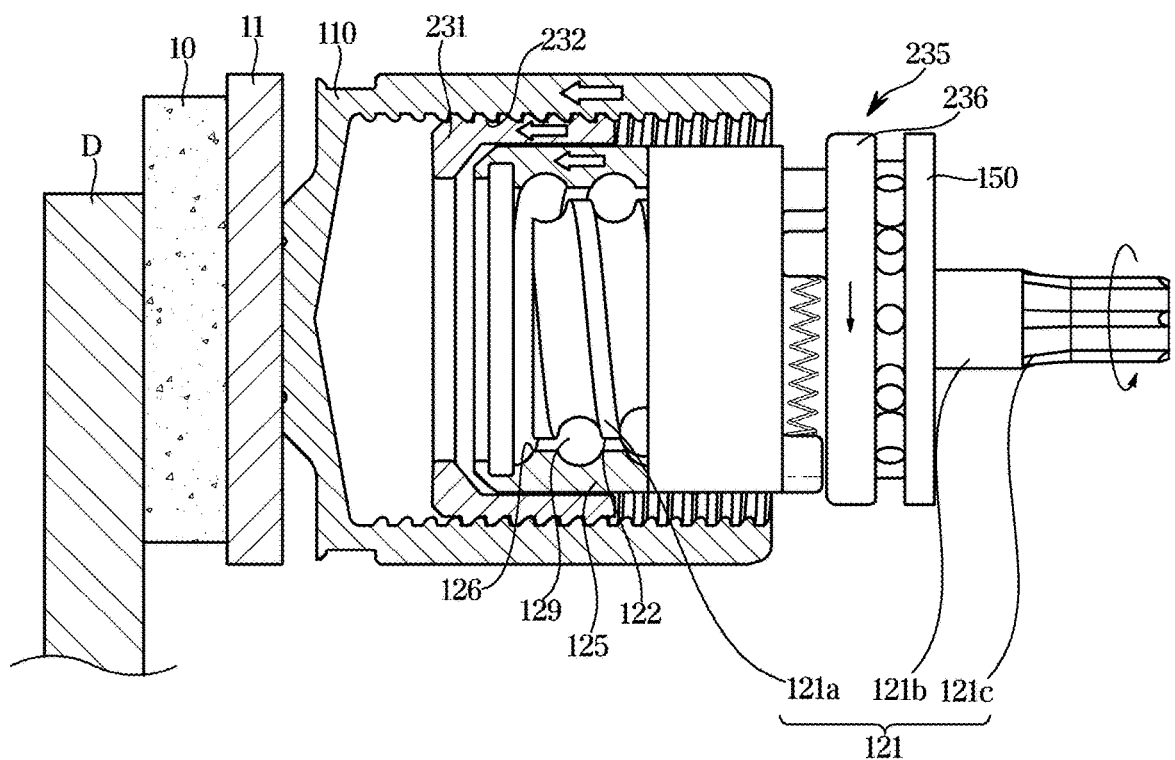
FIG. 10 is a lateral cross-sectional view illustrating an operation of the electromechanical brake according to the second embodiment of the disclosure in a state in which friction is generated between the brake disc and the brake pad during braking of the vehicle.

FIG. 9 is a lateral cross-sectional view illustrating an operation of the electromechanical brake 100 according to the second embodiment of the disclosure in a state in which the brake disc D and the brake pad 10 are spaced apart from each other during braking of the vehicle, and FIG. 10 is a lateral cross-sectional view illustrating an operation of the electromechanical brake according to the second embodiment of the disclosure in a state in which friction is generated between the brake disc D and the brake pad 10 during braking of the vehicle.

Referring to FIGS. 7, 9 and 10, in a general braking such as a service brake of a vehicle, the electromechanical brake 100 may operate to switch to the braking state from the braking release state which is illustrated in FIG. 7 and the braking release state in the no-load section which is illustrated in FIG. 9, and then operate to press the brake disc D by generating friction between the brake pad 10 and the brake disc D in the braking process of the brake in the load section illustrated in FIG. 10.

First, when the driver presses the brake pedal (not shown) to brake the vehicle, the pedal displacement sensor (not shown) detects a braking intention of the driver as an electric signal and transmits the detected electric signal to the electronic control unit. Based on this, the electronic control unit may control the operation of the actuator so that the brake pad 10 comes into close contact with the brake disc D to perform braking of the vehicle.

When the vehicle is braked, the spindle 121 rotates in the first direction by the operation of the actuator, and by the rotation of the spindle 121, the piston 110 presses the pad plate 10 to generate friction between the brake pad 10 and the brake disc D, so that the braking is performed. At this time, the braking operation is performed by sequentially reaching from the no-load section in which the brake pad 10 is spaced apart from the brake disc D to the load section in which the brake pad 10 is in close contact with the brake disc D.

Referring to FIG. 9, as the spindle 121 rotates in the first direction by the operation of the actuator during the braking operation in the no-load section, the first protrusion 237 presses the coil spring 234 and the second protrusion 238. At this time, the nut 125 and the adjusting screw 231 rotate in the first direction together with the spindle 121 by the elastic force of the coil spring 234 so that the relative position of the piston 110 moves forward. Accordingly, the piston 110 moves forward to press the pad plate 11, and the distance d between the brake disc D and the brake pad 10 is gradually shortened, and then the brake pad 10 come into close contact with the brake disc D.

Referring to FIG. 10, during the braking operation in the load section, a load is generated due to friction between the brake pad 10 and the brake disc D, the elastic force of the coil spring 234 is provided to be smaller than the screw fastening force between the adjusting screw 231 and the piston 110. Accordingly, when the spindle 121 rotates in the first direction in the load section, as the coil spring 234 is compressed between the first protrusion 237 and the second protrusion 238, the relative positions of the nut 125 and the adjusting screw 231 with respect to the spindle 121 move forward, and the piston 110 moves forward. As the piston 110 moves forward, the pad plate 11 is further pressed, and the brake pad 10 further presses the brake disc D in the state of being in close contact with the brake disc D to increase the braking force.

During the braking release of the vehicle, the spindle 121 rotates in the second direction by the operation of the actuator, the piston 110 moves backward by the rotation of the spindle 121 to release the pressing of the pad plate 10, and the brake pad 10 is spaced apart from the brake disc D, so that the braking release is performed. At this time, the braking release operation is performed by sequentially reaching from the load section in which the brake pad 10 is in close contact with the brake disc D to the no-load section in which the brake pad 10 is spaced apart from the brake disc D.

During the braking release operation in the load section, a load is generated due to friction between the brake pad 10 and the brake disc D, and the elastic force of the coil spring 234 is provided to be smaller than the screw fastening force between the adjusting screw 231 and the piston 110. Accordingly, when the spindle 121 rotates in the second direction by the operation of the actuator in the load section, the relative positions of the nut 125 and the adjusting screw 231 with respect to the spindle 121 move backward so that the piston 110 moves backward. Specifically, as the spindle 121 rotates in the second direction, the coil spring 234 expands so that the distance between the first protrusion 237 and the second protrusion 238 increases, and the relative positions of the nut 125, the adjusting screw 231 and the piston 110 with respect to the spindle 121 move backward so that the pressing of the pad plate 11 is gradually released to decrease the braking force.

During the braking release operation in the no-load section, the spindle 121 rotates in the second direction by the operation of the actuator, and the nut 125 rotates in the second direction together with the spindle 121 by the elastic force of the coil spring 234, so that the relative position of the nut 125, the adjusting screw 231 and the piston 110 moves backward. Accordingly, the piston 110 moves backward to completely release the pressing of the pad plate 11, and the distance d between the brake disc D and the brake pad 10 gradually increases.

Hereinafter, an operation method of adjusting a braking responsiveness of the electromechanical brake according to the first and second embodiments of the disclosure will be described.

Figure 11:
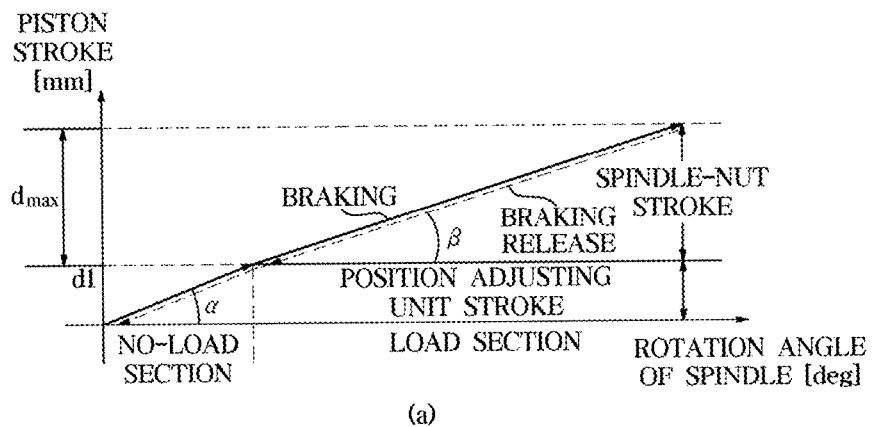
FIG. 11 is graphs illustrating piston stroke changes depending on a rotation angle of a spindle during a braking operation in a first mode to a third mode in the electromechanical brake of the disclosure.
Figure 11:
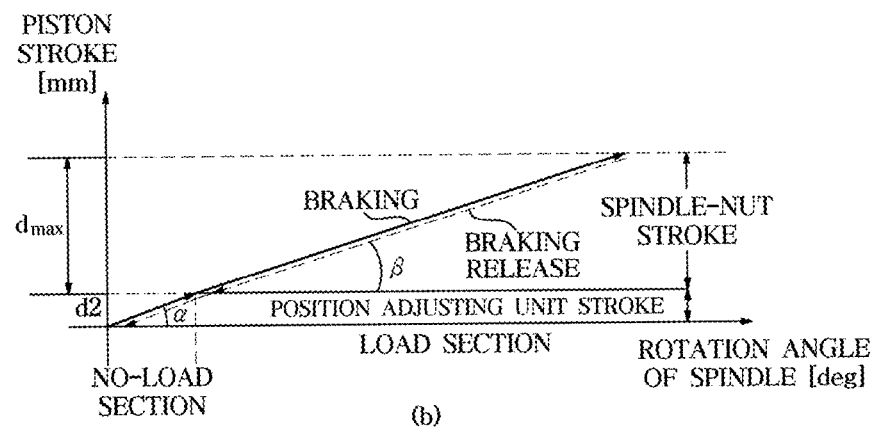
Figure 11:
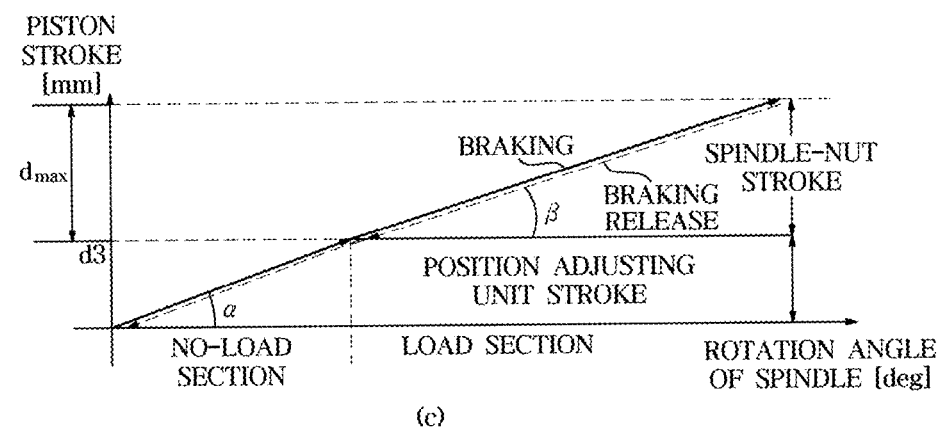
Figure 12:
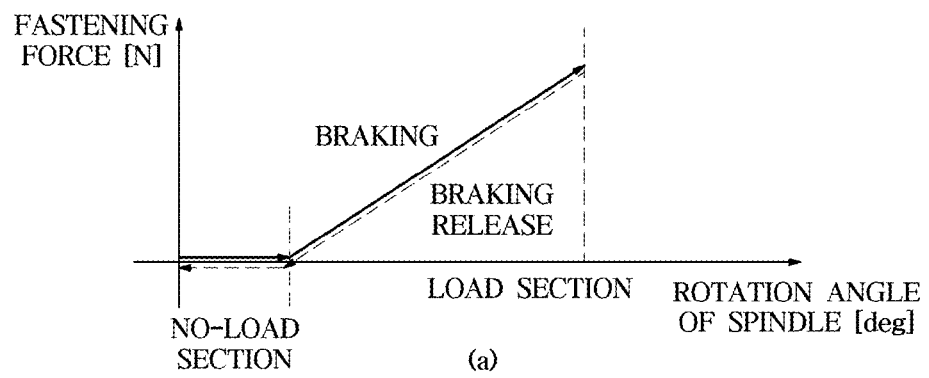
FIG. 12 is graphs illustrating fastening force changes between the brake disc and the brake pad depending on the rotation angle of the spindle during the braking operation in the first mode to the third mode in the electromechanical brake of the disclosure.
Figure 12:
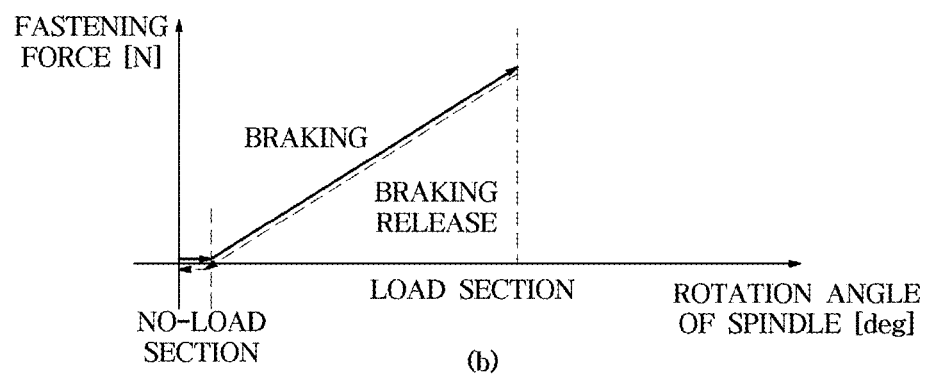
Figure 12:
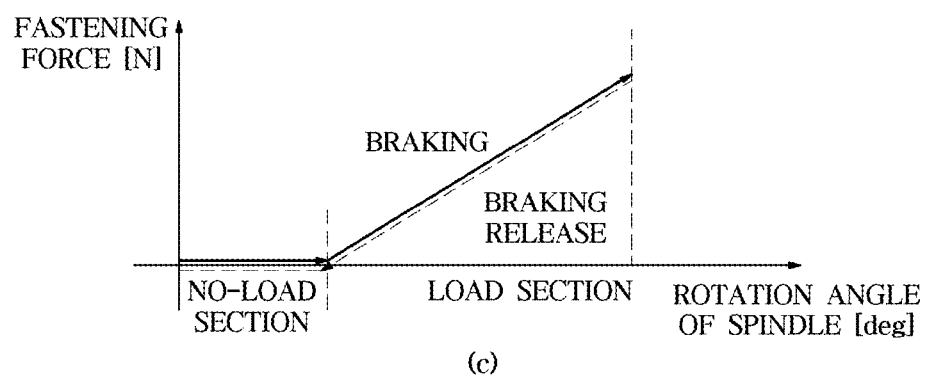

FIGS. 11A to 11C are graphs illustrating piston stroke changes depending on a rotation angle of the spindle 121 during the braking operation in a first mode to a third mode in the electromechanical brake of the disclosure, and FIGS. 12A to 12C are graphs illustrating fastening force changes between the brake disc D and the brake pad 10 depending on the rotation angle of the spindle 121 during the braking operation in the first mode to the third mode in the electromechanical brake of the disclosure.

Referring to FIGS. 11A to 11C and 12A to 12C, the electromechanical brake of the disclosure may adjust the braking responsiveness by adjusting the distance d between the brake disc D and the brake pad 10 in the no-load section in which the brake disc D and the brake pad 10 are spaced apart from each other. Specifically, when the spindle 121 rotates in the no-load section, through the movement of the relative position of the piston 110 with respect to the position adjusting units 130 and 230, the distance d between the brake disc D and the brake pad 10 in the braking release state (initial state) of the vehicle may be adjusted, thereby adjusting the braking responsiveness.

The electronic control unit may control in the first mode in which the distance d between the brake disc D and the brake pad 10 is adjusted to be a first distance d1 in the braking release state (initial state) of the vehicle by controlling the rotation angle of the spindle 121 within the no-load section, the second mode in which the distance d is adjusted to be a second distance d2 that is smaller than the first distance d1, and the third mode in which the distance d is adjusted to be a third distance d3 that is larger than the first distance d1.

Referring to FIGS. 4, 9, 11A to 11C, and 12A to 12C, in the first mode, when the distance d between the brake disc D and the brake pad 10 is larger than the first distance d1 in the braking release state of the vehicle, the spindle 121 rotates in the first direction to induce rotation of the nut 125 and the adjusting screws 131 and 231 in the first direction, and the relative position of the piston 110 moves forward by the rotation of the adjusting screws 131 and 231 in the first direction, so that the distance d between the brake disc D and the brake pad 10 may be adjusted to be the first distance d1 in the braking release state of the vehicle. Also, in the first mode, when the distance d between the brake disc D and the brake pad 10 is smaller than the first distance d1 in the braking release state of the vehicle, the spindle 121 rotates in the second direction to induce rotation of the nut 125 and the adjusting screws 131 and 231 in the second direction, and the relative position of the piston 110 moves backward by the rotation of the adjusting screws 131 and 231 in the second direction, so that the distance d between the brake disc D and the brake pad 10 may be adjusted to be the first distance d1 in the braking release state of the vehicle (see FIGS. 11A and 12A).

In the second mode, when the distance d between the brake disc D and the brake pad 10 is larger than the second distance d2 in the braking release state of the vehicle, the spindle 121 rotates in the first direction to induce rotation of the nut 125 and the adjusting screws 131 and 231 in the first direction, and the relative position of the piston 110 moves forward by the rotation of the adjusting screws 131 and 231 in the first direction, so that the distance d between the brake disc D and the brake pad 10 may be adjusted to be the second distance d2 (see FIGS. 11A and 12A).

In the third mode, when the distance d between the brake disc D and the brake pad 10 is smaller than the third distance d3 in the braking release state of the vehicle, the spindle 121 rotates in the second direction to induce rotation of the nut 125 and the adjusting screws 131 and 231 in the second direction, and the relative position of the piston 110 moves backward by the rotation of the adjusting screws 131 and 231 in the second direction, so that the distance d between the brake disc D and the brake pad 10 may be adjusted to be the third distance d3 (see FIGS. 11A and 12A).

When operated in the second mode, the distance d between the brake disc D and the brake pad 10, which is in the initial state, is adjusted to be the relatively short second distance d2, so that a braking distance in the no-load section during the braking operation may be decreased and the braking responsiveness may be improved.

When operated in the third mode, the distance d between the brake disc and the brake pad 10, which is in the initial state, is adjusted to be the relatively long third distance d3, so that the braking distance in the no-load section during the braking operation may be increased, and drag caused by friction between the brake disc D and the brake pad 10 may be reduced, thereby improving fuel efficiency As illustrated in FIGS. 11A to 11C, an inclination angle α of a position adjusting unit stroke among strokes of the piston 110 with respect to the rotation angle of the spindle 121 may be larger than an inclination angle β of a spindle 121-nut 125 stroke. Because a stroke by the adjusting screws 131 and 231-piston 110 occurs in the no-load section, the inclination angle α of the position adjusting unit stroke is determined depending on leads of the adjusting screws 131 and 231, and because a stroke by the spindle 121-nut 125 occurs in the load section, the inclination angle β of a spindle 121-nut 125 stroke is determined depending on a lead of the spindle 121. In this case, because in the no-load section, the faster a speed at which the brake pad 10 moves forward or backward toward the brake disc D is better, it is preferable that the leads of the adjusting screws 131 and 231 are large, while because in the load section, the stronger a force that the brake pad 10 presses on the brake disc D is the better, it is preferable that the lead of the spindle 121 is small. In other words, the leads of the adjusting screws 131 and 231 may be formed relatively larger than the lead of the spindle 121, and thus the inclination angle α of the position adjusting unit stroke with respect to the rotation angle of the spindle 121 may be formed larger than the inclination angle β of the spindle-nut stroke.

Because the electromechanical brake of the disclosure only adjusts the braking responsiveness by adjusting the distance d between the brake disc D and the brake pad 10 in the no-load section in the state in which the brake disc D and the brake pad 10 are spaced apart from each other in the first to third modes, a maximum stroke $d_{max}$ of the piston 110 in the load section is the same in all of the first to third modes.

Hereinafter, an electromechanical brake according to a modified example of the first embodiment of the disclosure will be described.

An electromechanical brake according to a modified embodiment of the disclosure described below is the same as the electromechanical brake 100 according to the embodiments described above except for the content in which reference numbers are additionally designated and additionally described. Therefore, a description of the redundant content will be omitted.

Figure 13:
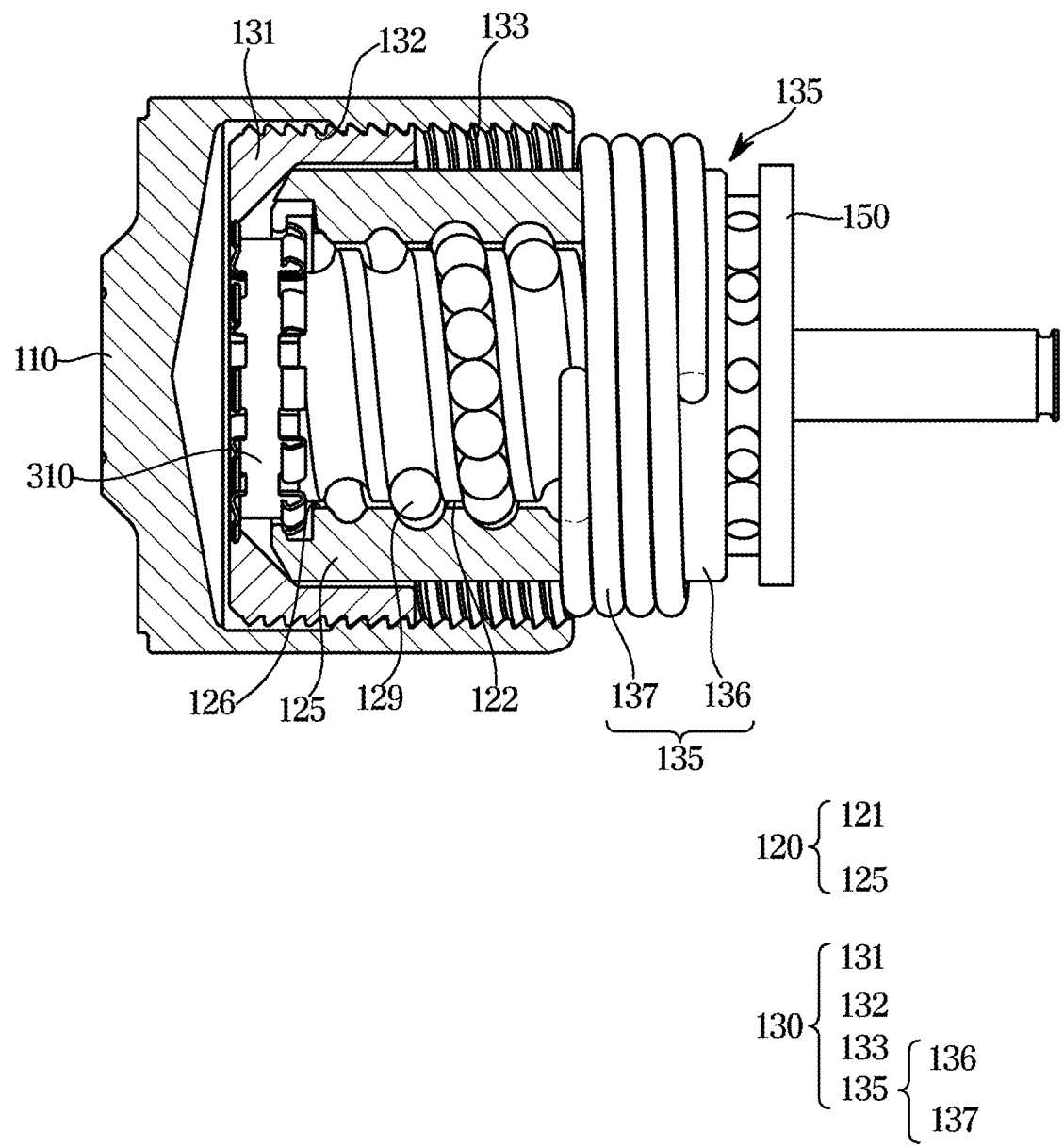
FIG. 13 is an enlarged lateral cross-sectional view of a main part of an electromechanical brake according to a modified example of the first embodiment of the disclosure.

FIG. 13 is an enlarged lateral cross-sectional view of a main part of an electromechanical brake 100 according to a modified example of the first embodiment of the disclosure. Referring to FIG. 13, a coupling cap 310 for coupling the adjusting screw 131 and the nut 125 to each other may be provided.

The coupling cap 310 is provided to cover a front opening of the nut 125, an inner circumference side thereof is fixed to and supported on the nut 125, and an outer circumference side thereof is fixed to and supported on an inner circumferential surface of the adjusting screw 131, thereby coupling the adjusting screw 131 and the nut 125 to each other. The rotational and linear motions of the nut 125 and the adjusting screw 131 may be synchronized by the coupling cap 310, and further, the adjusting screw 131 and the piston 110 are screwed to each other to move integrally. Accordingly, when the braking of the vehicle is released, as the nut 125 returns to its original position, the adjusting screw 131 and the piston 110 also smoothly return to their original positions, so that a subsequent braking operation of the vehicle may be quickly prepared.

As is apparent from the above, an electromechanical brake and an operation method thereof according to the disclosure can adjust braking response performance and drag performance by adjusting a distance between a brake disc and a brake pad of a vehicle.

Further, the electromechanical brake and the operation method thereof according to the disclosure can maintain and improve braking performance of the vehicle despite wear of the brake pad.

Further, the electromechanical brake and the operation method thereof according to the disclosure can stably brake the vehicle even in various operating situations of the vehicle.

Further, the electromechanical brake and the operation method thereof according to the disclosure can improve applicability to the vehicle and space utilization of the vehicle by reducing size and weight.

Further, the electromechanical brake and the operation method thereof according to the disclosure can easily compensate for wear of the brake pad with a simple structure.

Further, the electromechanical brake and the operation method thereof according to the disclosure can improve braking performance and suppress braking noise and vibration by reducing a drag phenomenon.

What is claimed is:

1. An electromechanical brake comprising:
   a piston provided to be movable forward and backward to press a brake pad toward a brake disc rotating together with a wheel;
   a power conversion unit comprising a spindle provided to rotate by receiving a driving force from an actuator, and a nut connected to the spindle to move forward or backward by rotation of the spindle in a first direction or a second direction to move the piston forward and backward;
   a position adjusting unit comprising an adjusting screw provided on the outside of the nut to rotate together with the nut, a first screw thread formed on an outer circumferential surface of the adjusting screw, a second screw thread formed on an inner circumferential surface of the piston to be engaged with the first screw thread, and an adjuster provided between the spindle and the nut to rotate the nut and the adjusting screw in the first direction or the second direction by rotation of the spindle to move a relative position of the piston with respect to the power conversion unit forward or backward; and
   an electronic control unit provided to control an operation of the actuator,
   wherein the electronic control unit controls the actuator to adjust a distance d between the brake disc and the brake pad.

2. The electromechanical brake according to claim 1, wherein
   the adjuster comprises:
   a flange formed on an outer circumferential surface of the spindle to extend in a radial direction; and
   a torsion spring having one end supported on the nut and the other end supported on the flange.

3. The electromechanical brake according to claim 2, wherein
   an elastic force of the torsion spring is provided to be larger than a screw fastening force between the adjusting screw and the piston.

4. The electromechanical brake according to claim 3, wherein
   the position adjusting unit further comprises a coupling cap to couple the adjusting screw and the nut.

5. The electromechanical brake according to claim 1, wherein
   the adjuster comprises:
   a flange formed on an outer circumferential surface of the spindle to extend in a radial direction;
   a first protrusion protruding from the flange;
   a second protrusion protruding from the nut; and
   a coil spring having one end supported on the first protrusion and the other end supported on the second protrusion to provide an elastic force when the spindle rotates in the first direction.

6. The electromechanical brake according to claim 5, wherein
   an elastic force of the coil spring is provided to be larger than a screw fastening force between the adjusting screw and the piston.

7. The electromechanical brake according to claim 5, wherein
   the adjuster further comprises a third protrusion formed to protrude from the flange and to be spaced apart from the first protrusion, and
   the third protrusion is caught on the second protrusion when the spindle rotates in the second direction to induce rotation of the nut in the second direction.

8. The electromechanical brake according to claim 1, wherein
   the position adjusting unit further comprises a coupling cap to couple the adjusting screw and the nut.

9. An operation method of the electromechanical brake according to claim 1,
   wherein the electronic control unit controls in a first mode in which the distance d between the brake disc and the brake pad is adjusted to be a first distance d1 in a braking release state of a vehicle by controlling a rotation angle of the spindle, a second mode in which the distance d is adjusted to be a second distance d2 that is smaller than the first distance d1, and a third mode in which the distance d is adjusted to be a third distance d3 that is larger than the first distance d1.

10. The operation method according to claim 9, wherein in the first mode,
    when the distance d between the brake disc and the brake pad is larger than the first distance d1 in the braking release state of the vehicle, the spindle rotates in the first direction to induce rotation of the nut and the adjusting screw in the first direction, and
    the relative position of the piston moves forward by the rotation of the adjusting screw in the first direction, so that the distance d between the brake disc and the brake pad is adjusted to be the first distance d1 in the braking release state of the vehicle.

11. The operation method according to claim 9, wherein in the first mode,
    when the distance d between the brake disc and the brake pad is smaller than the first distance d1 in the braking release state of the vehicle, the spindle rotates in the second direction to induce rotation of the nut and the adjusting screw in the second direction, and
    the relative position of the piston moves backward by the rotation of the adjusting screw in the second direction, so that the distance d between the brake disc and the brake pad is adjusted to be the first distance d1 in the braking release state of the vehicle.

12. The operation method according to claim 9, wherein in the second mode,
    when the distance d between the brake disc and the brake pad is larger than the second distance d2 in the braking release state of the vehicle, the spindle rotates in the first direction to induce rotation of the nut and the adjusting screw in the first direction, and the relative position of the piston moves forward by the rotation of the adjusting screw in the first direction, so that the distance d between the brake disc and the brake pad is adjusted to be the second distance d2.

13. The operation method according to claim 9, wherein in the third mode,
    when the distance d between the brake disc and the brake pad is smaller than the third distance d3 in the braking release state of the vehicle, the spindle rotates in the second direction to induce rotation of the nut and the adjusting screw in the second direction, and the relative position of the piston moves backward by the rotation of the adjusting screw in the second direction, so that the distance d between the brake disc and the brake pad is adjusted to be the third distance d3.

14. An operation method of the electromechanical brake according to claim 2, wherein the electronic control unit generates rotation of the spindle in the first direction or the second direction in the braking release state of the vehicle to induce rotation of the nut and the adjusting screw in the first direction or the second direction by an elastic restoring force of the torsion spring, and moves a relative position of the piston with respect to the adjusting screw forward or backward by the rotation of the adjusting screw in the first direction or the second direction.

15. An operation method of the electromechanical brake according to claim 5, wherein the electronic control unit generates rotation of the first protrusion in the first direction or the second direction in the braking release state of the vehicle to induce rotation of the second protrusion, the nut and the adjusting screw in the first direction or the second direction by the elastic force of the coil spring, and moves a relative position of the piston with respect to the adjusting screw forward or backward by the rotation of the adjusting screw in the first direction or the second direction.

* * * * *